United States Patent
Allen et al.

(10) Patent No.: US 10,755,182 B2
(45) Date of Patent: *Aug. 25, 2020

(54) SYSTEM AND METHOD FOR GROUND TRUTH EVALUATION

(71) Applicant: INTERNATIONAL BUSINESS MACHINES CORPORATION, Armonk, NY (US)

(72) Inventors: Corville O. Allen, Morrisville, NC (US); Andrew R. Freed, Cary, NC (US); Joseph N. Kozhaya, Morrisville, NC (US); Dwi Sianto Mansjur, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 732 days.

This patent is subject to a terminal disclaimer.

(21) Appl. No.: 15/234,676

(22) Filed: Aug. 11, 2016

(65) Prior Publication Data

US 2018/0046937 A1  Feb. 15, 2018

(51) Int. Cl.
*G06N 5/04* (2006.01)

(52) U.S. Cl.
CPC .................... *G06N 5/04* (2013.01)

(58) Field of Classification Search
CPC ...... G06N 20/00; G06N 5/04; G06F 17/2785; G06F 16/3329; G06F 16/24578
See application file for complete search history.

(56) References Cited

U.S. PATENT DOCUMENTS

| 8,346,701 | B2 * | 1/2013 | Wang .................. G09B 7/02 706/46 |
| 8,738,362 | B2 | 5/2014 | Ferrucci et al. |
| 8,868,516 | B2 | 10/2014 | Laredo et al. |
| 9,495,648 | B1 | 11/2016 | Boyer et al. |
| 9,621,601 | B2 * | 4/2017 | Johnson, Jr. ......... G06Q 10/101 |

(Continued)

OTHER PUBLICATIONS

Latha et al., "AFGF: An Automatic Facet Generation Framework for Document Retrieval," 2010, IEEE, International Conference on Advances in Computer Engineering, pp. 110-114 (Year: 2010).*

(Continued)

*Primary Examiner* — Eric Nilsson
*Assistant Examiner* — Catherine F Lee
(74) *Attorney, Agent, or Firm* — Conley Rose, P.C.

(57) ABSTRACT

A method for training a question answering system includes providing training questions to a question answering system executing on a computer and to a plurality of subject matter experts. The question answering system generates first answers to each training question. Second answers to the training questions are received from the subject matter experts. Feature scores for each of the first answers and the second answers are generated and compared across the second answers and the first answers. Each of the feature scores is representative of a quality of an answer that is indicative of relevance to a corresponding training question. Based on the comparing, a measure of consistency of the feature scores of the second answers is determined, and a measure of consistency of the feature scores of the second answers to the first answers is determined. The measures of consistency are transmitted to the subject matter experts.

20 Claims, 8 Drawing Sheets

(56) References Cited

U.S. PATENT DOCUMENTS

| | | |
|---|---|---|
| 2004/0015329 A1 | 1/2004 | Shayegan et al. |
| 2004/0215606 A1* | 10/2004 | Cossock ............... G06F 16/337 |
| 2014/0297571 A1 | 10/2014 | Beamon et al. |
| 2014/0298199 A1 | 10/2014 | Johnson, Jr. et al. |
| 2016/0247165 A1 | 8/2016 | Ryabchun et al. |
| 2016/0371490 A1 | 12/2016 | Shakarian et al. |
| 2017/0154015 A1 | 6/2017 | O'Keeffe et al. |

OTHER PUBLICATIONS

Anonymously; "System and method for generating type distribution of a training data set in a Question/Answering System"; http://ip.com/IPCOM/000239801D; Dec. 2, 2014.

Anonymously; "Automatic, In-Domain, Question/Answer-Set Generation"; http://ip.com/IPCOM/000245124D; Feb. 10, 2016.

Anonymously; "Improving User Feedback in a Question Answering System for Indirect Answers"; http://ip.com/IPCOM/000239021D; Oct. 1, 2014.

Drozda et al.; "Online Crowdsource System Supporting Ground Truth Datasets Creation"; Artificial Intelligence and Soft Computing, 12th International Conference, ICAISC 2013, Proceedings LNCS 7894; pp. 532-539; 2013.

Office Action dated Apr. 1, 2019, U.S. Appl. No. 15/234,767, filed Aug. 11, 2016; 26 pages.

Yang, et al., "Defining and Evaluating Network Communities Based on Ground Truth," Spring p. 182-213 (Year 2013).

Notice of Allowance dated Jul. 31, 2019, U.S. Appl. No. 15/234,767, filed Aug. 11, 2016; 15 pages.

\* cited by examiner

SYSTEM AND METHOD FOR GROUND TRUTH EVALUATION

STATEMENT REGARDING FEDERALLY SPONSORED RESEARCH OR DEVELOPMENT

N/A.

STATEMENT REGARDING PRIOR DISCLOSURES BY THE INVENTOR OR A JOINT INVENTOR

N/A.

BACKGROUND

The present invention relates to training of cognitive computing systems, and more specifically, to techniques and mechanisms for improving the results generated by a Question and Answer system by analyzing and ranking ground truth provided by subject matter experts and feeding back ranking and evaluation information of the ground truth to the subject matter experts.

With the increased usage of computing networks, such as the Internet, users can easily be overwhelmed with the amount of information available from various structured and unstructured sources. However, information gaps abound as users try to piece together what they believe to be relevant during searches for information on various subjects. To assist with such searches, research has been directed to creating cognitive systems such as Question and Answer (QA) systems that take an input question, analyze the question, and return results indicative of the most probable answer or answers to the input question. QA systems provide automated mechanisms for searching through large sets of sources of content, e.g., electronic documents, and analyze them with regard to an input question to determine an answer to the question and a confidence measure as to how accurate an answer to the question might be.

The IBM Watson™ system available from International Business Machines (IBM) Corporation of Armonk, N.Y. offers several services that can be used to build such QA systems. The IBM Watson™ system is an application of advanced natural language processing, information retrieval, knowledge representation and reasoning, and machine learning technologies to the field of open domain question answering.

The quality of the responses provided by a QA system is tied to the training provided to the system. When a cognitive system is trained, ground truth is provided to the system. The quality of system training, and in turn, the quality of the cognitive system is determined by the quality of the ground truth used to train the system. The primary feedback for a set of ground truth is either a manual inspection by experts at training cognitive systems, or an evaluation of the cognitive system after a lengthy system training phase. Both of these solutions yield long feedback cycles and make it difficult for users to quickly get a sense of the quality of the ground truth they are providing to the system.

SUMMARY

According to an embodiment of the present invention, a method includes providing training questions to a question answering system executing on a computer. The question answering system generates first answers to each of the training questions. The training questions are also provided to a plurality of subject matter experts. Second answers to the training questions are received from the subject matter experts. The method also includes generating a plurality of feature scores for each of the first answers and the second answers. Each of the feature scores is representative of a quality of an answer that is indicative of relevance to a corresponding training question. For each of the training questions, the method includes comparing feature scores across the second answers and the first answers. Based on results of the comparing, a measure of consistency with respect to the feature scores of the second answers to one another is determined, and a measure of consistency with respect to the feature scores of the second answers to the first answers is determined. Results of the determinations of consistency are transmitted to one or more of the subject matter experts. In an embodiment of a method, the generating may also include evaluating the first answers and the second answers with respect to a plurality of scoring features comprising for example of one or more scoring features selected from a group comprising question type, focus, lexical answer type, sentence structure, grammatical modifiers, and other linguistic and semantic features. An embodiment of the method may also include identifying which of the scoring features are associated with features scores of the second answers that exceed a predetermined threshold across a predetermined number of the subject matter experts. An embodiment of the method may also include configuring the question answering system to rank potential answers to a question based on feature scores corresponding to the scoring features associated with features scores of the second answers that exceed the predetermined threshold. An embodiment of the method may also include identifying, based on results of the comparing, at least one of the subject matter experts corresponding to feature scores that exhibit less than a predetermined degree of similarity to the feature scores corresponding to others of the subject matter experts. In an embodiment of the method, results of the determinations of consistency are provided to the at least one of the subject matter experts. An embodiment of the method may also include generating a vector indicative of value of each of the feature scores in each of the first answers and the second answers, and determining a distance between each two of the vectors.

In another embodiment, a system/apparatus is provided. The system/apparatus includes a question answering system executed by a computer, one or more processors, and memory. The memory is encoded with instructions that when executed cause the one or more processors to provide a training system for training the question answering system. The training system may be configured to perform various ones of, and various combinations of the operations described above with respect to embodiments of a method.

In a further embodiment, a computer program product including a computer readable storage medium encoded with program instructions is provided. The program instructions are executable by a computer to cause the computer to perform various ones of, and various combinations of the operations described above with respect to embodiments of a method.

DETAILED DESCRIPTION

Figure 1:
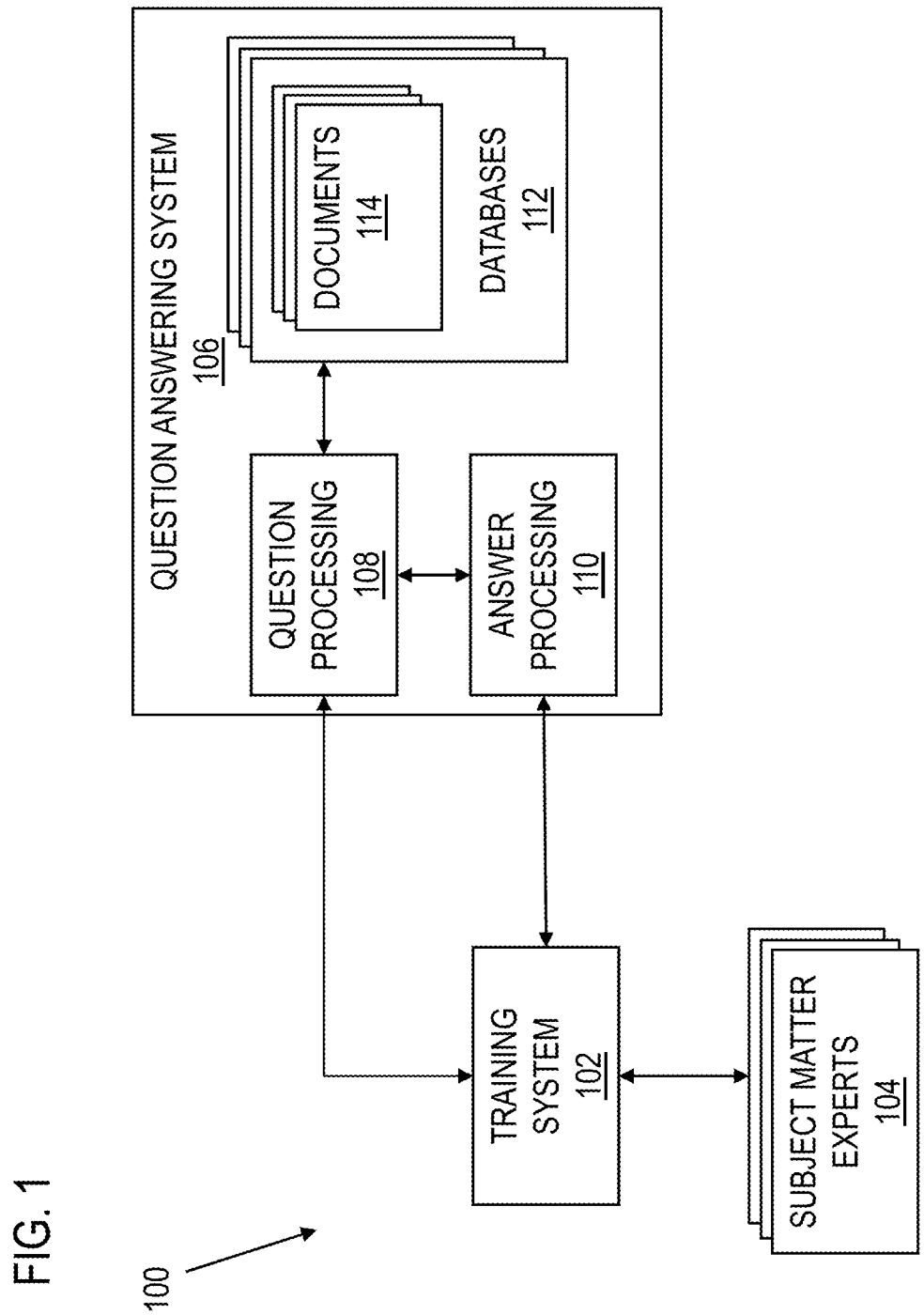
FIG. 1 shows a block diagram of a system that provides evaluation of subject matter experts in accordance with various embodiments.

A question and answer system (QA system) is an artificial intelligence application executing on data processing hardware that answers questions pertaining to a given subject-matter domain or domains presented in natural language. The QA system may receive inputs from various sources including input over a network, a corpus of electronic documents or other data, data from a content creator, information from one or more content users, and other such inputs from other sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query a document from the QA system, e.g., sending the query to the QA system as a well-formed question which is then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, a QA system receives an input question, parses the question to extract the major features of the question, uses the extracted features to formulate queries, and then applies those queries to the corpus of data. Based on the application of the queries to the corpus of data, the QA system generates a set of hypotheses or candidate answers to the input question, by looking across the corpus of data for portions of the corpus of data that have some potential for containing a valuable response to the input question. The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while yet others algorithms may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model may then be used to summarize a level of confidence that the QA system has regarding the evidence that the potential response, i.e., the candidate answer, is inferred by the question. This process may be repeated for each of the candidate answers until the QA system identifies one or more candidate answers as being significantly stronger than others and thus, generates a final answer, or ranked set of answers, for the input question.

The quality of the candidate answers provided by a QA system is related to the training provided to the system during the training of the system. When a QA system is trained, ground truth is provided to the system. The quality of QA system training, and in turn, the quality of the QA system overall is determined by the quality of the ground truth used to train the system. In conventional systems, the primary feedback for a set of ground truth is either a manual inspection by experts at training QA systems, or an evaluation of the QA system after its lengthy training phase. Both of these solutions yield long feedback cycles and make it difficult for users to quickly get a sense of the quality of the ground truth they are providing to the QA system.

For example, in a conventional system, training may rely on multi-user generation of ground truth to train a ranking service where each user is tasked with ranking answers that were retrieved by the system. The features used to build up a ranking service depend on how the users generate the ground truth from the questions and the answers. Unfortunately, the users may be provided with no indication of how well they are ranking the answers in relation to each other and in relation to the ranking service of the QA system.

Embodiments of the present disclosure improve the effectiveness of machine learning systems, such as QA systems, by evaluating the ground truth provided by users, such as subject matter experts, used to train the system. Embodiments of the training system disclosed herein analyze ranked ground truth provided by multiple subject matter experts against a system, and determine when the subject matter experts provide a better ground truth set based on the characteristics of the question and answer pairs in relation to the system. Thus, embodiments enable the subject matter experts to become aware of providing better answers than the system which benefits the overall accuracy of the system. Embodiments process a question and a set of potential answers to the question for characteristics related to question type, focus, lexical answer types, sentence structure and grammatical modifiers to create features for use in identifying commonality and convergence in the ranking of the set of answers to the question. Based on this convergence among subject matter experts and the difference from the system answers, the subject matter experts are provided with feedback on the quality of ground truth being produced (e.g., feedback on consistency & consistent improvements compared to default). When a percentage of the subject matter experts align based on the scores and differ from the default system, the quality of the ground truth on a single question and across the set is good. The training system disclosed herein analyzes a question, establishes feature vectors based on key question analysis features, and cross correlates the feature vectors with a set of candidate answer feature vectors to determine a measure of quality of the ground truth provided by the subject matter experts.

FIG. 1 shows a block diagram of a system 100 that provides evaluation of subject matter experts in accordance with various embodiments. The system 100 includes a QA system 106, a training system 102, and a number of subject matter experts 104. The QA system 106 is a machine learning system that receives training from the training system 102. The training guides and adjusts the operation of the QA system 106 to improve the quality of the answers provided by the QA system 106. The QA system 106 is illustrative and is not intended to state or imply any limitation with regard to the type of QA mechanisms with which various embodiments may be implemented. Many modifications to the example QA system 100 may be implemented in various embodiments.

The system 100, including the QA system 106, the training system 102, and computer/terminal devices via which the subject matter experts 104 communicate with the training system 102, may be implemented on one or more computing devices (comprising one or more processors and one or more memories, and optionally including any other computing device elements generally known in the art including buses, storage devices, communication interfaces, and the like).

The QA system 100 operates by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

The QA system 106 includes question processing 108, answer processing 110, and databases 112. The databases 112 store documents 114 that serve as at least a part of the corpus of content from which answers to questions are derived. The documents 114 may include any file, text, article, or source of data for use in the QA system 106. The question processing 108 receives questions to be answered by the QA system 106. The questions may be formed using natural language. The questions may be provided by the training system 102 to facilitate training of the QA system 106, or may be provided by users of the QA system 106. The training system 102 may be coupled to the QA system 106 via a network, such as a local area network, a wide area network, the internet, or other communication system.

In some illustrative embodiments, the QA system 106 may be the IBM Watson™ QA system available from International Business Machines Corporation of Armonk, N.Y. The IBM Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus for portions of the corpus of data that have some potential for containing a valuable response to the input question.

The IBM Watson™ QA system analyzes the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

The question processing 108 receives input questions that are presented in a natural language format. That is, a user of the training system 102 may input, via a user interface, an input question to obtain an answer. In response to receiving the input question, the question processing 108 parses the input question using natural language processing techniques to extract major features from the input question, classify the major features according to types, e.g., names, dates, or any of a variety of other defined topics. The identified major features may then be used to decompose the question into one or more queries that may be submitted to the databases 112 in order to generate one or more hypotheses. The queries may be generated in any known or later developed query language, such as the Structure Query Language (SQL), or the like. The queries may be submitted to one or more databases 112 storing the documents 114 and other information.

The queries may be submitted to one or more databases 112 storing information about the electronic texts, documents, articles, websites, and the like, that make up the corpus of data/information. The queries are submitted to the databases 112 to generate results identifying potential hypotheses for answering the input question. That is, the submission of the queries results in the extraction of portions of the corpus of data/information matching the criteria of the particular query. These portions of the corpus are analyzed and used to generate hypotheses for answering the input question. These hypotheses are also referred to herein as "candidate answers" for the input question. For any input question, there may be hundreds of hypotheses or candidate answers generated that need to be evaluated.

The answer processing 110 analyzes and compares the language of the input question and the language of each hypothesis or "candidate answer" as well as performs evidence scoring to evaluate the likelihood that a particular hypothesis is a correct answer for the input question. As mentioned above, this process may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

The answer processing 110 may synthesize the large number of relevance scores generated by the various reasoning algorithms into confidence scores for the various hypotheses. This process may involve applying weights to the various scores, where the weights have been determined through training of the statistical model employed by the QA system 106. The weighted scores may be processed in accordance with a statistical model generated through training of the QA system 106 that identifies a manner by which these scores may be combined to generate a confidence score or measure for the individual hypotheses or candidate answers. This confidence score or measure summarizes the level of confidence that the QA system 106 has about the evidence that the candidate answer is inferred by the input question, i.e. that the candidate answer is the correct answer for the input question.

In the answer processing 110, the resulting confidence scores or measures may be compared against predetermined thresholds, or other analysis may be performed on the confidence scores to determine which hypotheses/candidate answers are most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, a final answer and confidence score, or final set of candidate answers and confidence scores, may be generated and output to the submitter of the original input question.

The training system 102 facilitates configuration of the QA system 106 to provide answers to submitted questions and to improve the quality of the answers provided to submitted questions. The quality of the answers to a submitted question may be improved by selecting the candidate answers that are most relevant to the question. The quality of the answers provided by the QA system 106 is related to the ground truth input by the subject matter experts 104 that is used to train the QA system 106. Embodiments of the training system 102 improve the quality of the answers provided by the QA system 106 by analyzing the ground truth input by the subject matter experts 104 and providing feedback that allows the subject matter experts to improve the ground truth provided to train the QA system 106.

In one embodiment, the training system 102 provides a number of questions to the QA system 106. The questions provided by the training system 102 to the QA system 106 are referred to herein as "training questions." The QA system 106 processes the training questions and selects a number of candidate answers for each of the training questions. The QA system 106 provides the candidate answers to the training system 102. In turn, the training system 102 provides the training questions and the corresponding candidate answers to the subject matter experts 104. Each of the subject matter experts 104 scores and ranks the candidate answers. For example, each of the subject matter experts 104 may apply a score (e.g., a value from 1-4, 1-5, 1-10, etc.) to each of the candidate answers as a measure of the relevance of the candidate answer to the corresponding training question.

The training system 102 analyzes each of the candidate answers with respect to a number of scoring features. Each of the scoring features evaluates the candidate answer based on particular attributes of the candidate answer that are indicative of the relevance of the candidate answer to the corresponding training question. A variety of scoring features are known in the art, and any such scoring features may be applied by the training system 102. For example, scoring features applied to the candidate answers may evaluate question and answer with respect to linguistic and syntactic features, such as presence of select terms of the training question in the candidate answer (i.e., term matching), relevance of a source document 114 to the candidate answer, sentence structure and grammatical constructs of a candidate answer, focus of a candidate answer, etc. Term matching may include determining whether one or more terms present in a question are also present in a given answer. For example, bi-gram matching determines whether two words match between question and answer, tri-gram matching determines whether three words match between question and answer, n-gram matching determines whether N words match between question and answer, skip n-gram matching determines whether N words that are not directly adjacent to one another are present in the question and answer, tri-gram matching.

The training system 102 analyzes the candidate answers to determine which of the scoring features are most important to the subject matter experts 104 in deciding answer relevance, and to determine whether the subject matter experts 104 are consistent with respect to scoring feature importance. The training system 102 may generate a vector for each set of feature scores for each subject matter expert 104 and for the QA system 106. The contents of the vector may specify a number of times that each scoring feature was predictive of a high quality candidate answer. The training system 106 may compute a distance between each pair of the vectors to determine how consistent the subject matter experts have been with respect to the importance of the scoring features.

The training system 102 can compute a metric for ground truth based on the vector distances. A value of the metric may indicate whether agreement between the subject matter experts 104 is higher than between the subject matter experts 104 and the QA system 106. In an embodiment, the metric may be computed as:

average(inter-*SME* vector distance)/average(*SME*-QA system vector difference)

Some embodiments of the training system 102 may exclude subject matter expert vectors that are close in value to the QA system vector from the metric calculation.

The training system 102 may provide the metric and other information derived from analysis of the candidate answers and the subject matter experts' evaluation of the candidate answers to the subject matter experts 104. For example, the training system 102 may apprise each of the subject matter experts 104 of whether their evaluations are consistent with one another and with the QA system 106. The training system 102 may apprise each of the subject matter experts 104 of the importance of each of the scoring features in determining candidate answer relevance based on the subject matter experts' evaluations. The subject matter experts 104 may apply the feedback information to provide more consistent ground truth information for training of the QA system 106.

The training system 102 may also provide information to the QA system 106 indicative of the relative importance of the various scoring features in the subject matter experts' evaluation of the candidate answers. The QA system 106 may apply the information to select and/or rank candidate answers such that the relevance of the candidate answers is more closely aligned with the scoring features deemed of highest importance to the subject matter experts 104.

Figure 2:
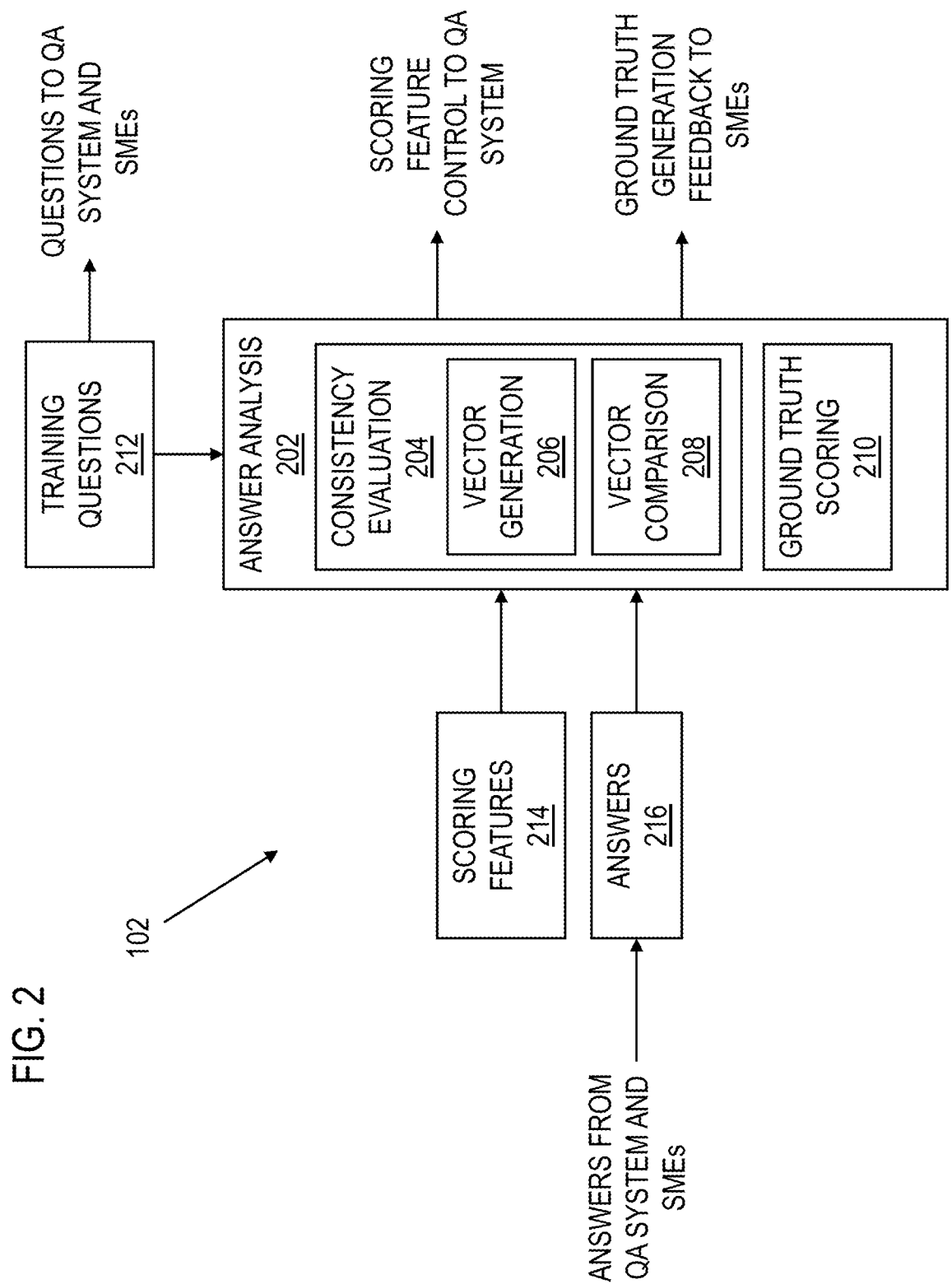
FIG. 2 shows a block diagram of an embodiment of a training system that provides evaluation of subject matter experts in accordance with various embodiments.

FIG. 2 shows a block diagram of an embodiment of the training system 102. The training system 102 includes answer analysis 202, training questions 212, scoring features 214, and answers 216. The training system 102 provides the training questions 212 to the QA system 106 and to the subject matter experts 104. The QA system 106 and the subject matter experts 104 return answers to the training questions 212 to the training system 102 as answers 216. The answers 216, the training questions 212, and the scoring features 214 are provided to the answer analysis 202.

The answer analysis 202 evaluates the answers 216 in light of the questions 212 and the scoring features 214 to determine whether the answers provided by the subject matter experts 104 provide a better ground truth than the answers provided by the QA system 106. The answer analysis 202 includes consistency evaluation 204 and ground truth scoring 210. The consistency evaluation 204 compares the answers provided by the subject matter experts 104 to the answers provided by the QA system 106. The comparison may include applying the scoring features to each answer, in light of the corresponding question, to generate a number of feature scores (e.g., a score for each feature) for each answer. The consistency evaluation 204 analyzes the feature scores of the answers 216 to determine whether the subject matter experts 104 are consistent with regard to the application and importance of the scoring features in the answers 216. The consistency evaluation includes vector generation 206 and vector comparison 208. For each subject matter expert 104, and for the QA system 106, the vector generation 206 produces a vector containing values indicating the importance of each scoring feature in assessing the relevance of an answer to a corresponding question. For example, the vector may contain a value indicating, for each scoring feature, the number of time that the scoring feature was predictive of a high quality answer (e.g., the number of times that the scoring feature was above a predetermined threshold value). The vector comparison 208 compares the vectors to identify differences in application of the scoring features across the subject matter experts 104 and the QA system 106. The vector comparison 208 may compute a difference value for each pair of the vectors. The difference value is indicative of a level of agreement between two subject matter experts 104 or a subject matter expert 104 and the QA system 106 with respect to the importance of the scoring features in selecting high quality answers to a question.

The ground truth scoring 210 generates a metric value that reflects a level of agreement between the subject matter experts 104. If the level of agreement between the subject matter experts 104 is higher than the level of agreement between the subject matter experts 104 and the QA system 106, then the ground truth provided by the subject matter experts 104 would contribute to improved answers provided by the QA system 106 after training based on that ground truth. In other words, the subject matter experts 104 are effective at producing ground truth for training the QA system 106. On the other hand, if the level of agreement between the subject matter experts 104 and the QA system 106 is higher than the level of agreement between the subject matter experts 104 then the subject matter experts 104 may not be effective at producing ground truth for training the QA system 106. In some embodiments, the ground truth scoring 210 may produce a scoring value as a ratio of average inter-subject matter expert vector distance to average difference between subject matter expert vectors and QA system vector.

The answer analysis 202 provides information from evaluation of the answers 216 to the subject matter experts 104 and/or the QA system 106. Feedback provided to the subject matter experts 104 may include the metric value generated by the ground truth scoring 210 and consistency information generated by the consistency evaluation 204. For example, the subject matter experts 104 may be provided with information indicating the level of agreement between the subject matter experts 104 and/or between the subject matter experts 104 and the QA system 106. In some embodiments, a subject matter expert 104 may be provided with information indicating a level of agreement between the subject matter expert 104 and the other subject matter experts 104 and/or between the subject matter expert 104 and the QA system 106. The subject matter experts 104 may apply the feedback information to better understand the quality of ground truth provided to train the QA system 106, and to thereafter provide higher quality ground truth for training the QA system 106.

The answer analysis 202 may also provide information derived from the consistency evaluation 204 to the QA system 106. For example, the answer analysis 202 may provide information related to the highest value scoring features in the answers 216 provided by the subject matter experts 104 to the QA system 106, which in turn the QA system 106 may apply to generate higher quality answers.

Figure 3:
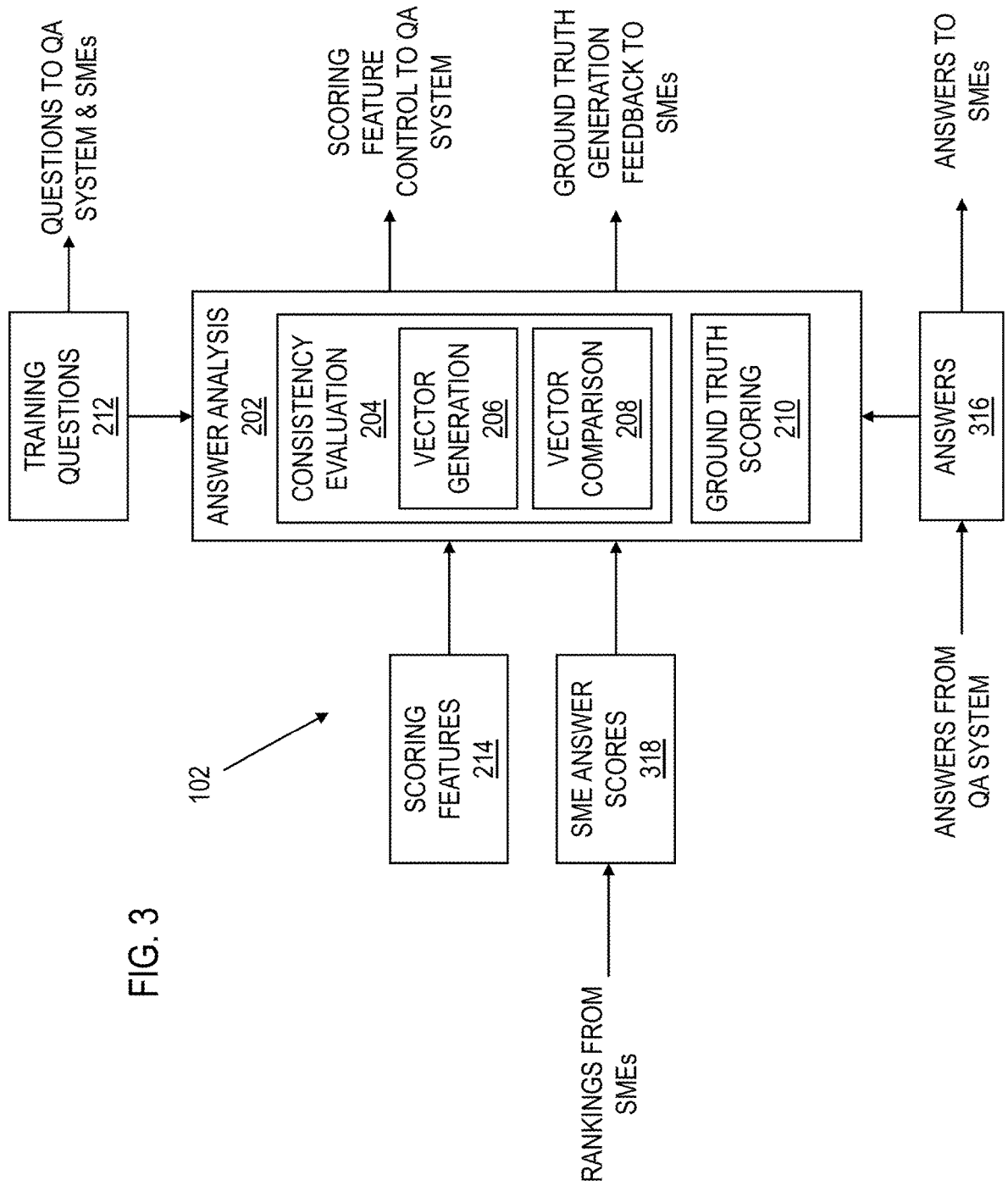
FIG. 3 shows a block diagram of an embodiment of a training system that provides evaluation of subject matter experts in accordance with various embodiments.

FIG. 3 shows a block diagram of an embodiment of the training system 102. The training system 102 includes answer analysis 202, training questions 212, scoring features 214, answers 316, and subject matter expert answer scores 318. The training system 102 provides the training questions 102 to the QA system 106. The QA system 106 returns, to the training system 102, answers to the training questions 102 as answers 316. The answers 316, the training questions 212, and the scoring features 214 are provided to the answer analysis 202. The training system 102 also provides the answers 316 and the training questions 212 to the subject matter experts 104. The subject matter experts 104 score the answers 316 in light of the corresponding training question 212. For example, each of the subject matter experts 104 may assign a value (e.g., 1-4) to each of the answers 316, wherein 4 indicates an answer 316 is highly relevant to the corresponding training question 212 and 1 indicates that an answer 316 is much less relevant to the corresponding training question 212.

The answer analysis 202 evaluates the answers 316 in light of the questions 212, the scores 318, and the scoring features 214 to determine whether the subject matter experts 104 are consistently judging ground truth produced by the QA system 106. The answer analysis 202 includes consistency evaluation 204 and ground truth scoring 210. The consistency evaluation 204 compares the scores provided by the subject matter experts 104 to rankings provided by the QA system 106. The comparison may include applying the scoring features 214 to each answer, in light of the corresponding question, to generate a number of feature scores (e.g., a score for each feature) for each answer 316. Table 1 below shows an example of a number of answers 316, provided by the QA system 106, to a given training question 212. Rankings assigned by one of the subject matter experts 104, and feature scores for each of eight scoring features are shown.

TABLE 1

| Answer | SME Score | F1 Score | F2 Score | F3 Score | F4 Score | F5 Score | F6 Score | F7 Score | F8 Score |
|---|---|---|---|---|---|---|---|---|---|
| Answer 1 | 4 | 0.1 | 1.0 | 0.3 | 0.1 | 0.98 | 0.2 | 0.0 | 0.99 |
| Answer 2 | 4 | 0.1 | 1.0 | 0.3 | 0.1 | 0.97 | 0.1 | 0.0 | 0.98 |
| Answer 3 | 4 | 0.1 | 0.8 | 0.2 | 0.1 | 0.75 | 0.2 | 0.01 | 0.96 |
| Answer 4 | 3 | 0.1 | 0.75 | 0.2 | 0.1 | 0.8 | 0.2 | 0.01 | 0.96 |
| Answer 5 | 1 | 0.0 | 0.8 | 0.1 | 0.05 | 0.1 | 0.15 | 0.04 | 0.3 |
| Answer 6 | 1 | 0.0 | 0.8 | 0.1 | 0.05 | 0.1 | 0.15 | 0.04 | 0.3 |
| Answer 7 | 1 | 0.1 | 0.9 | 0.1 | 0 | 0.4 | 0.1 | 0.2 | 0.2 |
| Answer 8 | 1 | 0.0 | 0.6 | 0.1 | 0.05 | 0.1 | 0.15 | 0.04 | 0.3 |
| Answer 9 | 4 | 0.08 | 0.99 | 0.3 | 0.1 | 0.95 | 0.1 | 0.01 | 0.98 |

The data of table 1 show that the subject matter expert 104 found answers 1, 2, 3, and 9 to highly relevant to the question. Scoring features 2, 5, and 8 appear to be important in assessing answer relevance.

The consistency evaluation 204 analyzes the feature scores of the answers 316 to determine whether the subject matter experts 104 are consistent with regard to the application and importance of the scoring features in the answers 316. The consistency evaluation 204 includes vector generation 206 and vector comparison 208. For each subject matter expert 104, and for the QA system 106, the vector generation 206 produces a vector containing values indicating the importance of each scoring feature in assessing the relevance of an answer 316 to a corresponding question 212. For example, the vector may contain a value indicating, for each scoring feature, the number of times that the scoring feature was predictive of a high quality answer (e.g., the number of times that the scoring feature was above a predetermined threshold value). The vector comparison 208 compares the vectors to identify differences in application of the scoring features across the subject matter experts 104 and the QA system 106. The vector comparison 208 may compute a difference value for each pair of the vectors. The difference value is indicative of a level of agreement between two subject matter experts 104 or a subject matter expert 104 and the QA system 106 with respect to the importance of the scoring features in selecting high quality answers to a question.

The ground truth scoring 210 generates a metric value that reflects a level of agreement between the subject matter experts 104. If the level of agreement between the subject matter experts 104 is higher than the level of agreement between the subject matter experts 104 and the QA system 106, then the ground truth selected by the subject matter experts 104 may be better than the ground truth selected by the QA system 106. In other words, the subject matter experts 104 are effective at selecting ground truth for training the QA system 106. On the other hand, if the level of agreement between the subject matter experts 104 and the QA system 106 is higher than the level of agreement between the subject matter experts 104 then the subject matter experts 104 may not be effective at selecting ground truth for training the QA system 106. In some embodiments, the ground truth scoring 210 may produce a scoring value as a ratio of average inter-subject matter expert vector distance to average difference between subject matter expert vectors and QA system vector.

The answer analysis 202 provides information from evaluation of the answers 316 to the subject matter experts 104 and/or the QA system 106. Feedback provided to the subject matter experts 104 may include the metric value generated by the ground truth scoring 210 and consistency information generated by the consistency evaluation 204. For example, the subject matter experts 104 may be provided with information indicating the level of agreement between the subject matter experts 104 and/or between the subject matter experts 104 and the QA system 106. In some embodiments, a subject matter expert 104 may be provided with information indicating a level of agreement between the subject matter expert 104 and the other subject matter experts 104 and/or between the subject matter expert 104 and the QA system 106. The subject matter experts 104 may apply the feedback information to better understand the quality of ground truth provided to train the QA system 106, and to provide higher quality ground truth for training the QA system 106.

The answer analysis 202 may also provide information derived from the consistency evaluation 204 to the QA system 106. For example, the answer analysis 202 may provide information related to the feature scores of the answers 316 provided by the subject matter experts 104 to the QA system 106, which in turn the QA system 106 may apply to generate higher quality answers.

Figure 4:
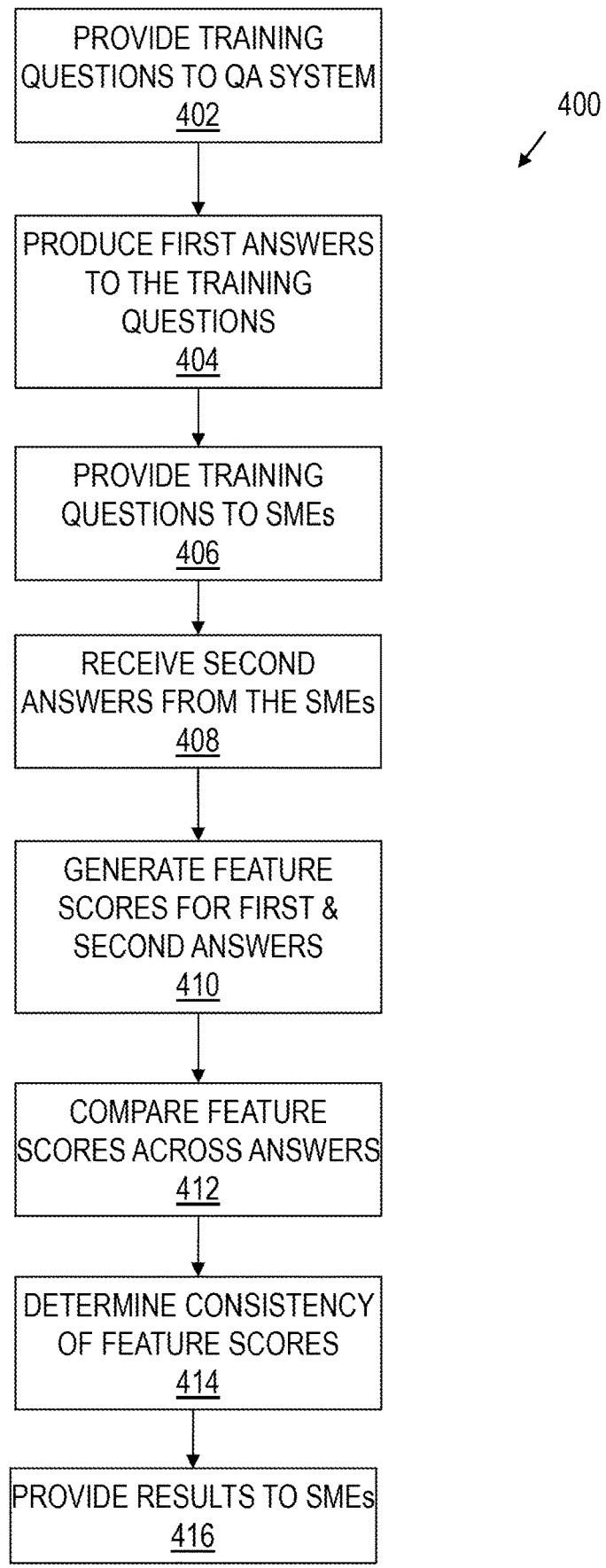
FIG. 4 shows a flow diagram for an embodiment of a method for providing ground truth that includes evaluation of subject matter experts in accordance with various embodiments.

FIG. 4 shows a flow diagram for an embodiment of a method 400 for providing ground truth that includes evaluation of subject matter experts in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 400 may be provided by instructions executed by a computer of the system 100.

In block 402, the QA system 106 is being trained. The training system 102 provides training questions 212 to the QA system 106.

In block 404, the QA system 106 processes the training questions 212, generates queries, and retrieves candidate answers from the databases 112. The QA system 106 ranks the candidate answers and transmits the candidate answers to the training system 102 via a network or other communication system that couples the training system 102 to the QA system 106. The training system 102 receives and stores the candidate answers provided by the QA system 106.

In block 406, the training system 102 provides the training questions 212 to the subject matter experts 104. For example, the training system 102 may transmit the training questions 212 to computers used by the subject matter experts 104 via a network that communicatively couples the training system 102 to the computers used by the subject matter experts 104. The subject matter experts 104 generate answers to the training questions 212, and transmit the answers to the training system 102. In block 408, the training system 102 receives and stores the answers provided by the subject matter experts 104.

In block 410, the training system 102 analyzes the answers received from the QA system 106 and the subject matter experts 104 with respect to a plurality of scoring features 214. For each of the answers, the training system 102 generates a feature score for each of the scoring features 214.

In block 412, the training system 102 compares the feature scores across the answers.

In block 414, the training system 102 determines whether the features scores exhibit a pattern of consistency across the answers with respect to ranking of the answers for relevance to the corresponding question. For example, the training system 102 may determine whether the answers provided by each of the subject matter experts 104 exhibits a pattern of consistency with respect to feature scores.

In block 416, the training system 102 provides results of analysis of the answers to the subject matter experts 104. For example, the training system 102 may inform the subject matter experts 104 of whether they were consistent or inconsistent with respect to the scoring features, and may inform the subject matter experts 104 as to a level of agreement with others of the subject matter experts 104 and the QA system 106. The subject matter experts 104 may apply the information to produce better ground truth for training the QA system 106.

Figure 5:
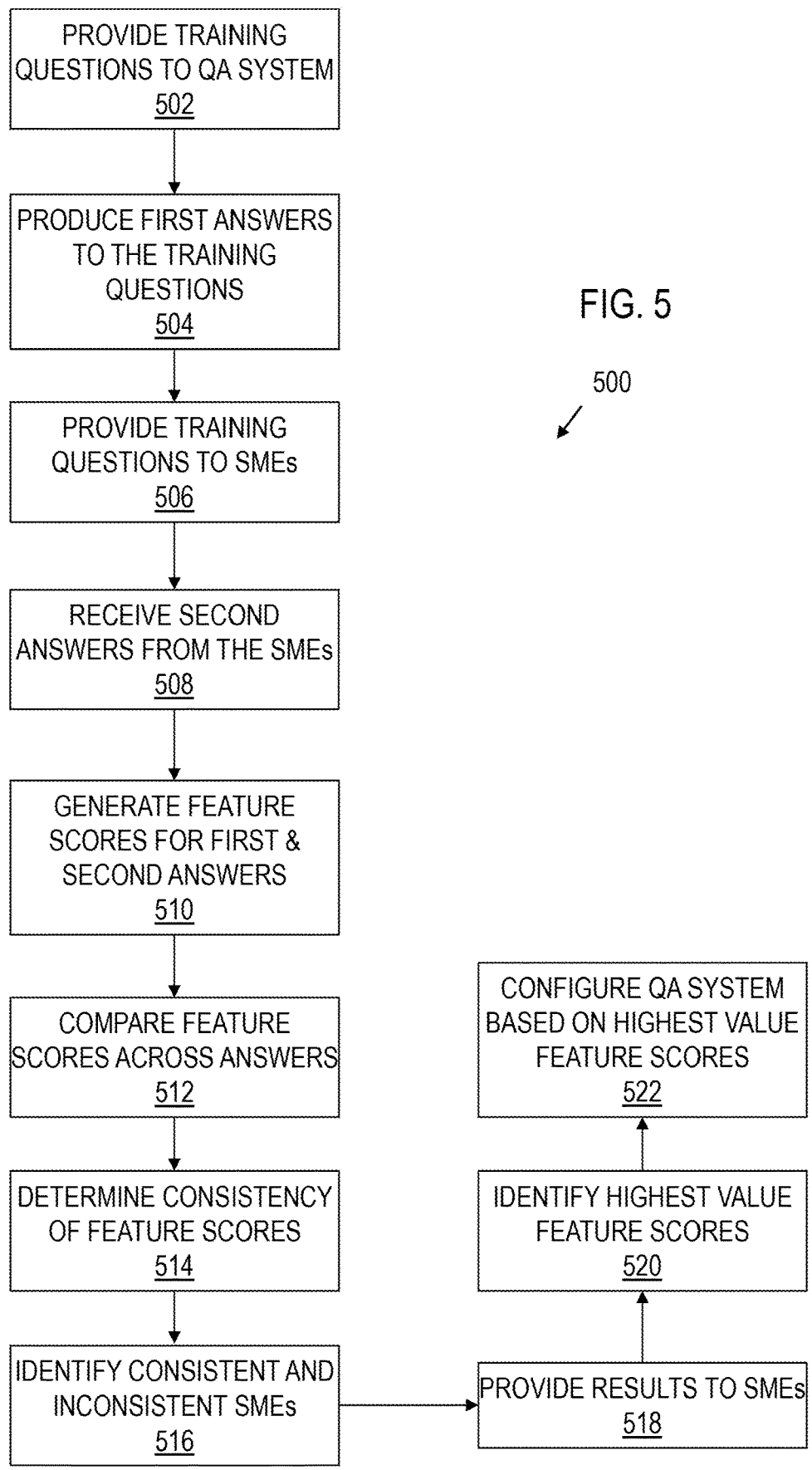
FIG. 5 shows a flow diagram for an embodiment of a method for providing ground truth that includes evaluation of subject matter experts in accordance with various embodiments.

FIG. 5 shows a flow diagram for an embodiment of a method 500 for providing ground truth that includes evaluation of subject matter experts in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 500 may be provided by instructions executed by a computer of the system 100.

In block 502, the QA system 106 is being trained. The training system 102 provides training questions 212 to the QA system 106.

In block 504, the QA system 106 processes the training questions 212, generates queries, and retrieves candidate answers from the databases 112. The QA system 106 ranks the candidate answers and transmits the candidate answers to the training system 102 via a network or other communication system that couples the training system 102 to the QA system 106. The training system 102 receives and stores the candidate answers provided by the QA system 106.

In block 506, the training system 102 provides the training questions 212 to the subject matter experts 104. For example, the training system 102 may transmit the training questions 212 to computers used by the subject matter experts 104 via a network that communicatively couples the training system 102 to the computers used by the subject matter experts 104. The subject matter experts 104 generate answers to the training questions 212, and transmit the answers to the training system 102. In block 508, the training system 102 receives and stores the answers provided by the subject matter experts 104.

In block 510, the training system 102 analyzes the answers received from the QA system 106 and the subject matter experts 104 with respect to a plurality of scoring features 214. For each of the answers, the training system 102 generates a feature score for each of the scoring features 214.

In block 512, the training system 102 compares the feature scores across the answers.

In block 514, the training system 102 determines whether the features scores exhibit a pattern of consistency across the answers with respect to ranking of the answers for relevance to the corresponding question. For example, the training system 102 may determine whether the answers provided by each of the subject matter experts 104 exhibits a pattern of consistency with respect to feature scores.

In block 516, the training system 102 identifies the subject matter experts 104 that are consistent with others of the subject matter experts 104, and identifies the subject matter experts 104 that are inconsistent with others of the subject matter experts 104. Consistency and inconsistency may be determined based on the scoring features found to be of highest importance in the answers provided by the subject matter experts 104, answer rankings provided by the subject matter experts, or other indications of subject matter expert consistency.

In block 518, the training system 102 provides the consistency information to the subject matter experts 104. For example, if the training system 102 deems a given subject matter expert 104 to be inconsistent with respect to the scoring features found to be most important in the answers provided by the given subject matter expert 104, then the training system 102 may inform the given subject matter expert 104 of the scoring features consistently found important by others of the subject matter expert 104, and may inform the given subject matter expert 104 of the scoring features found to be important in the answers provided by the given subject matter expert 104.

In block 520, the training system 102 identifies the scoring features that consistently produced the highest feature scores in answers provided by the subject matter experts 104. For example, if the training system 102 identifies feature scores higher than a predetermined threshold value in more than a predetermined percentage (e.g., a majority) of answers provided by the subject matter experts 104, then the training system 102 may deem the scoring features that produced the features scores to be of high value in producing relevant answers.

In block 522, the training system 102 informs the QA system 106 of the scoring features deemed to be of highest value in producing relevant answers. The QA system 106 may reconfigure the selection and/or ranking of candidate answers provided by the QA system 106 based on the scoring features deemed to be of highest value in producing relevant answers by the subject matter experts 104.

Figure 6:
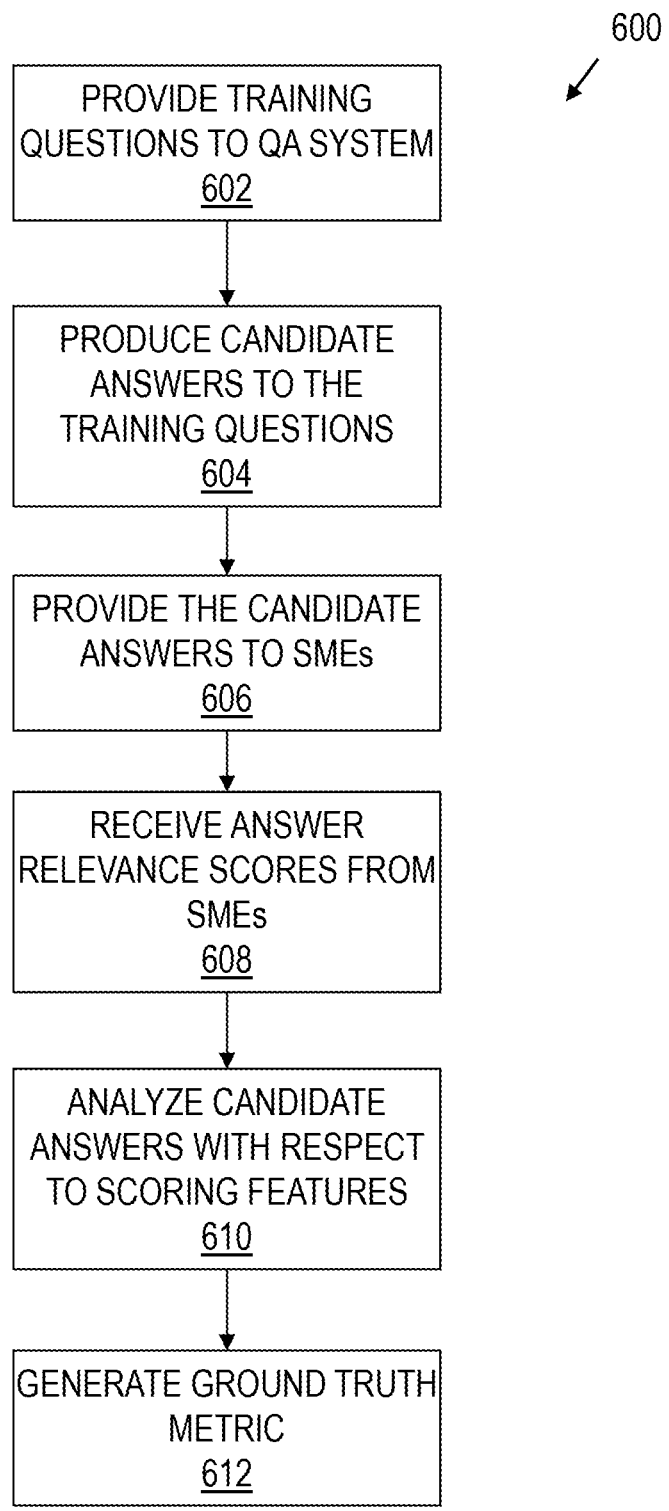
FIG. 6 shows a flow diagram for an embodiment of a method for providing ground truth that includes evaluation of subject matter experts in accordance with various embodiments.

FIG. 6 shows a flow diagram for an embodiment of a method 600 for providing ground truth that includes evaluation of subject matter experts in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600 may be provided by instructions executed by a computer of the system 100.

In block 602, the QA system 106 is being trained. The training system 102 provides training questions 212 to the QA system 106.

In block 604, the QA system 106 processes the training questions 212, generates queries, and retrieves candidate answers from the databases 112. The QA system 106 ranks the candidate answers and transmits the candidate answers to the training system 102 via a network or other communication system that couples the training system 102 to the QA system 106. The training system 102 receives and stores the candidate answers provided by the QA system 106.

In block 606, the training system 102 provides the candidate answers received from the QA system 106 and the corresponding training questions 212 to the subject matter experts 104. For example, the training system 102 may transmit the candidate answers and the training questions 212 to computers used by the subject matter experts 104 via a network that communicatively couples the training system 102 to the computers used by the subject matter experts 104. Each of the subject matter experts 104 assesses the relevance of each candidate answer to the corresponding training question 212 and assigns a relevance score to the candidate answer. The subject matter experts 104 transmit the relevance scores to the training system 102. In block 608, the training system 102 receives and stores the relevance scores provided by the subject matter experts 104.

In block 610, the training system 102 analyzes the candidate answers received from the QA system 106 with respect to a plurality of scoring features 214. For each of the candidate answers, the training system 102 generates a feature score for each of the scoring features 214.

In block 612, the training system 102 generates a ground truth metric value for the ground truth provided by the candidate answers as scored for relevance by the subject matter experts. The metric value may, for example, provide a determination of level of agreement between the subject matter experts with respect to the importance of the scoring features in producing a relevant candidate answer. The subject matter experts 104 may apply the metric value to produce better ground truth for training the QA system 106.

Figure 7:
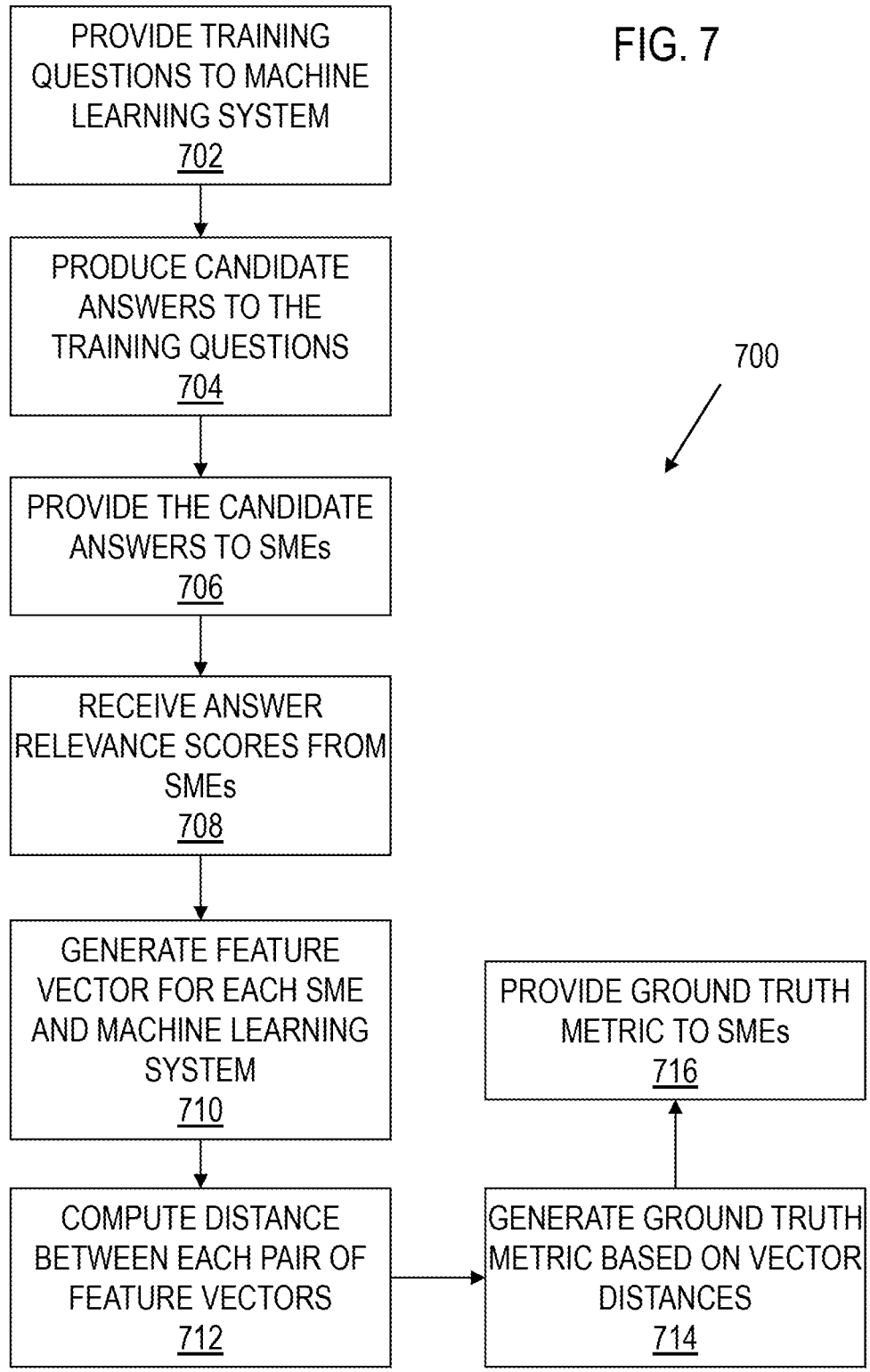
FIG. 7 shows a flow diagram for an embodiment of a method for providing ground truth that includes evaluation of subject matter experts in accordance with various embodiments.

FIG. 7 shows a flow diagram for an embodiment of a method 700 for providing ground truth that includes evaluation of subject matter experts in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 700 may be provided by instructions executed by a computer of the system 100.

In block 702, the QA system 106 is being trained. The training system 102 provides training questions 212 to the QA system 106.

In block 704, the QA system 106 processes the training questions 212, generates queries, and retrieves candidate answers from the databases 112. The QA system 106 ranks the candidate answers and transmits the candidate answers and the rankings to the training system 102 via a network or other communication system that couples the training system 102 to the QA system 106. The training system 102 receives and stores the candidate answers and rankings provided by the QA system 106.

In block 706, the training system 102 provides the candidate answers received from the QA system 106 and the corresponding training questions 212 to the subject matter experts 104. For example, the training system 102 may transmit the candidate answers and the training questions 212 to computers used by the subject matter experts 104 via a network that communicatively couples the training system 102 to the computers used by the subject matter experts 104. Each of the subject matter experts 104 assesses the relevance of each candidate answer to the corresponding training question 212 and assigns a relevance score to the candidate answer.

In block 708, the subject matter experts 104 transmit the relevance scores to the training system 102. The training system 102 receives and stores the relevance scores provided by the subject matter experts 104. The training system 708 may normalize the relevance scores provided by the subject matter experts 104 and the ranking values provided by the QA System 106 to facilitate comparison.

In block 710, the training system 102 generates a feature vector for each subject matter expert 104 and for the QA system 106. To produce the feature vectors, the training system 102 analyzes the candidate answers received from the QA system 106 with respect to a plurality of scoring features 214. For each of the candidate answers, the training system 102 generates a feature score for each of the scoring features 214. The contents of the feature vector may indicate the number of times that each of the scoring features was indicative of a high quality answer to a candidate question. For example, for each candidate answer assigned a relevance score higher than a predetermined value by a given subject matter expert 104, the training system 102 may count the number of times that each of the feature scores exceeded a threshold value. The count value for each scoring feature may be a component of the feature vector for the given subject matter expert 104.

In block 712, the training system 102 compares the feature vectors by computing the distance between each pair of feature vectors. For example, the training system 102 may compute the distance between two feature vectors as the Euclidean distance between the feature vectors. Some embodiments may determine distance between two feature vectors using any of a variety of distance functions.

In block 714, the training system 102 generates a ground truth metric value based on the distances between the feature vectors. A value of the metric may indicate that agreement between the subject matter experts 104 is higher than between the subject matter experts 104 and the QA system 106. In an embodiment the metric may be computed as a ratio of mean inter-subject matter expert vector distance to mean difference between subject matter expert vectors and QA system vector. In some embodiments, the training system 102 may exclude subject matter expert feature vectors that are close in value to the QA system vector from the metric calculation.

In block 714, the training system 102 provides the ground truth metric value to the subject matter experts 104. The training system 102 may provide other information to the subject matter experts 104 in conjunction with the metric value. For example, the training system 102 may provide each subject matter expert 104 with information indicative of the level of agreement between the subject matter expert 104 and the other subject matter experts 104. Agreement may relate to similarity of relevance scores between subject matter experts 104 and/or similarity of scoring feature significance.

Figure 8:
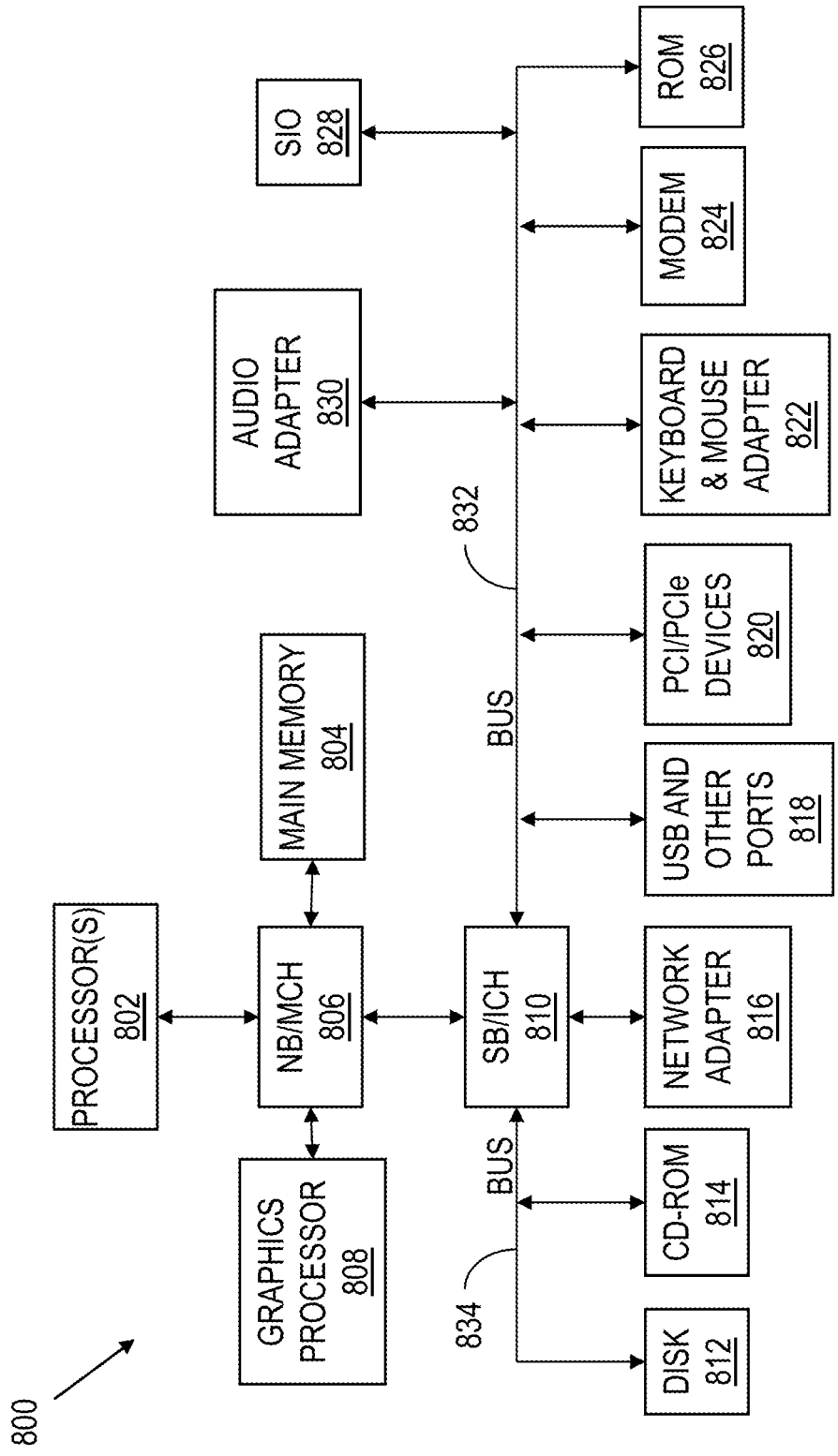
FIG. 8 shows a block diagram for an example of a data processing system that can be applied to implement embodiments of the present disclosure.

FIG. 8 is a block diagram of an example data processing system in which aspects of the illustrative embodiments may be implemented. Data processing system 800 is an example of a computer that can be applied to implement the training system 102, the question answering system 104, or devices providing the subject matter experts 104 access to the training system 102 in FIG. 1, in which computer usable code or instructions implementing the processes for illustrative embodiments of the present invention may be located. In one illustrative embodiment, FIG. 8 represents a computing device that implements the training system 102 augmented to include the additional mechanisms of the illustrative embodiments described hereafter.

In the depicted example, data processing system 800 employs a hub architecture including north bridge and memory controller hub (NB/MCH) 806 and south bridge and input/output (I/O) controller hub (SB/ICH) 810. Processor(s) 802, main memory 804, and graphics processor 808 are connected to NB/MCH 806. Graphics processor 808 may be connected to NB/MCH 806 through an accelerated graphics port (AGP).

In the depicted example, local area network (LAN) adapter 816 connects to SB/ICH 810. Audio adapter 830, keyboard and mouse adapter 822, modem 824, read only memory (ROM) 826, hard disk drive (HDD) 812, CD-ROM drive 814, universal serial bus (USB) ports and other communication ports 818, and PCI/PCIe devices 820 connect to SB/ICH 810 through bus 832 and bus 834. PCI/PCIe devices may include, for example, Ethernet adapters, add-in cards, and PC cards for notebook computers. PCI uses a card bus controller, while PCIe does not. ROM 826 may be, for example, a flash basic input/output system (BIOS).

HDD 812 and CD-ROM drive 814 connect to SB/ICH 810 through bus 834. HDD 812 and CD-ROM drive 814 may use, for example, an integrated drive electronics (IDE) or serial advanced technology attachment (SATA) interface. Super I/O (SIO) device 828 may be connected to SB/ICH 810.

An operating system runs on processor(s) 802. The operating system coordinates and provides control of various components within the data processing system 800 in FIG. 8. In some embodiments, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 800.

In some embodiments, data processing system 800 may be, for example, an IBM® eServer™ System p® computer system, running the Advanced Interactive Executive (AIX®) operating system or the LINUX® operating system. Data processing system 800 may be a symmetric multiprocessor (SMP) system including a plurality of processors 802. Alternatively, a single processor system may be employed.

Instructions for the operating system, the object-oriented programming system, and applications or programs are located on storage devices, such as HDD 812, and may be loaded into main memory 804 for execution by processor(s) 802. The processes for illustrative embodiments of the present invention may be performed by processor(s) 802 using computer usable program code, which may be located in a memory such as, for example, main memory 804, ROM 826, or in one or more peripheral devices 812 and 814, for example.

A bus system, such as bus 832 or bus 834 as shown in FIG. 8, may include one or more buses. The bus system may be implemented using any type of communication fabric or architecture that provides for a transfer of data between different components or devices attached to the fabric or architecture. A communication unit, such as modem 824 or network adapter 816 of FIG. 8, may include one or more devices used to transmit and receive data. A memory may be, for example, main memory 804, ROM 826, or a cache such as found in NB/MCH 806 in FIG. 8.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or eternal storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
providing training questions to a question answering system executing on a computer;
producing, by the question answering system, candidate answers to each of the training questions;
providing the training questions and the candidate answers to a plurality of subject matter experts;
receiving, from each of the subject matter experts, relevance scores for each of the candidate answers, wherein the relevance score of a respective candidate answer indicates a relevance of that candidate answer to a respective training question that led to the candidate answer;
for each of the subject matter experts, generating a vector for relevance scores of the subject matter expert;
for the question answering system, generating a vector for relevance scores of the question answering system;
determining a metric based on the vectors of the subject matter experts and the vectors of the question answering system to determine whether agreement of relevance scores among the subject matter experts is higher than agreement between the subject matter experts and the question answering system; and
transmitting results of the determining to at least one of the subject matter experts.

2. The method of claim 1, wherein the generating of the relevance scores comprises evaluating the candidate answers with respect to a plurality of scoring features comprising one or more scoring features selected from a group consisting of question type, focus, lexical answer type, sentence structure, term matching, and grammatical modifiers.

3. The method of claim 1, further comprising configuring the question answering system to rank potential answers to a question based on the relevance scores of the subject matter experts.

4. The method of claim 1, further comprising identifying, based on the results of the determining, a vector of at least one of the subject matter experts that exhibits less than a predetermined degree of similarity to the vectors of others of the subject matter experts.

5. The method of claim 1, wherein determining the metric comprises:
determining a ratio of an average distance between each vector of the subject matter experts to an average distance between vectors of the subject matter experts and the question answering system.

6. A system comprising:
a question answering system executed by a computer;
a processor configured to communicate with the question answering system; and
a memory coupled to the processor, the memory encoded with instructions that when executed cause the processor to provide a training system for training the question answering system, the training system configured to:

provide training questions to the question answering system;

retrieve, from the question answering system, candidate answers to each of the training questions;

provide the training questions and the candidate answers to a plurality of subject matter experts;

receive, from each of the subject matter experts, relevance scores for each of the candidate answers, wherein the relevance score of a respective candidate answer indicates a relevance of that candidate answer to a respective training question that led to the candidate answer;

for each of the subject matter experts, generating a vector for relevance scores of the subject matter expert;

for the question answering system, generating a vector for relevance scores of the question answering system;

determining a metric based on the vectors of the subject matter experts and the vectors of the question answering system to determine whether agreement of relevance scores among the subject matter experts is higher than agreement between the subject matter experts and the question answering system; and transmit results of the determining to one or more of the subject matter experts.

7. The system of claim 6, wherein the training system is configured to evaluate the candidate answers with respect to a plurality of scoring features comprising one or more scoring features selected from a group consisting of question type, focus, lexical answer type, sentence structure, term matching, and grammatical modifiers.

8. The system of claim 6, wherein the training system is configured to configure the question answering system to rank potential answers to a question based on the relevance scores of the subject matter experts.

9. The system of claim 6, wherein the training system is configured to identify, based on the determining, a vector of at least one of the subject matter experts that exhibits less than a predetermined degree of similarity to the vectors of others of the subject matter experts.

10. The system of claim 6, wherein the training system is configured to:

determine a ratio of an average distance between each vector of the subject matter experts to an average distance between vectors of the subject matter experts and the question answering system.

11. A computer program product for training a question answering system, the computer program product comprising a computer readable storage medium having program instructions embodied therewith, the program instructions executable by a computer to cause the computer to:

provide training questions to the question answering system;

retrieve, from the question answering system, candidate answers to each of the training questions;

provide the training questions and the candidate answers to a plurality of subject matter experts;

receive, from each of the subject matter experts, relevance scores for each of the candidate answers, wherein the relevance score of a respective candidate answer indicates a relevance of that candidate answer to a respective training question that led to the candidate answer;

for each of the subject matter experts, generating a vector for relevance scores of the subject matter expert;

for the question answering system, generating a vector for relevance scores of the question answering system;

determining a metric based on the vectors of the subject matter experts and the vectors of the question answering system to determine whether agreement of relevance scores among the subject matter experts is higher than agreement between the subject matter experts and the question answering system; and transmit results of the determining to one or more of the subject matter experts.

12. The computer program product of claim 11, wherein the program instructions are executable by the computer to cause the computer to evaluate the candidate answers with respect to a plurality of scoring features comprising one or more scoring features selected from a group consisting of question type, focus, lexical answer type, sentence structure, term matching, and grammatical modifiers.

13. The computer program product of claim 11, wherein the program instructions are executable by the computer to cause the computer to configure the question answering system to rank potential answers to a question based on the relevance scores of the subject matter experts.

14. The computer program product of claim 11, wherein the program instructions are executable by the computer to cause the computer to identify, based on the determining, a vector of at least one of the subject matter experts that exhibits less than a predetermined degree of similarity to the vectors of others of the subject matter experts.

15. The method of claim 1, further comprising generating confidence scores indicating a confidence in accuracy of each of the candidate answers based on the relevance scores of the question answering system.

16. The method of claim 15, further comprising ranking the candidate answers according to the confidence scores.

17. The system of claim 6, wherein the training system is configured to generate confidence scores indicating a confidence in accuracy of each of the candidate answers based on the relevance scores of the question answering system.

18. The system of claim 17, wherein the training system is configured to rank the candidate answers according to the confidence scores.

19. The computer program product of claim 11, wherein the program instructions are executable by the computer to cause the computer to generate confidence scores indicating a confidence in accuracy of each of the candidate answers based on the relevance scores of the question answering system.

20. The computer program product of claim 19, wherein the program instructions are executable by the computer to cause the computer to rank the candidate answers according to the confidence scores.

* * * * *